United States Patent

[11] 3,543,620

[72] Inventors Larry L. Hilsenbeck
Lancaster;
John Montoro, Clarence, New York
[21] Appl. No. 792,420
[22] Filed Jan. 21, 1969
[45] Patented Dec. 1, 1970
[73] Assignee Westinghouse Electric Corporation
Pittsburgh, Pennsylvania
a corporation of Pennsylvania

[54] METHOD AND APPARATUS FOR INDEXING FLYING SHEARS FOR FIRST CUT SYNCHRONIZATION
5 Claims, 2 Drawing Figs.
[52] U.S. Cl....................................................... 83/37,
83/298, 83/311, 83/367, 83/411
[51] Int. Cl....................................................... B26d 1/56

[50] Field of Search............................................ 83/37, 38,
288, 298, 311, 367, 416

[56] References Cited
UNITED STATES PATENTS
3,149,520  9/1964  Fish et al. .................... 83/288
3,267,781  8/1966  Sterns et al. .................. 83/416X

*Primary Examiner*—James M. Meister
*Attorneys*—F. H. Henson, R. G. Brodahl and C. J. Paznokas ABSTRACT: A flying shear located along a strip processing line cuts the moving strip into pieces of equal predetermined length. The shear is adjustable to change the predetermined length. There is disclosed a system and method for indexing the shear to make a first (front crop cut) of a desired length before it starts the normal cuts of the predetermined equal length. This maneuver is called first cut synchronization, and the apparatus and method disclosed herein perform this maneuver by jogging the shear backwards.

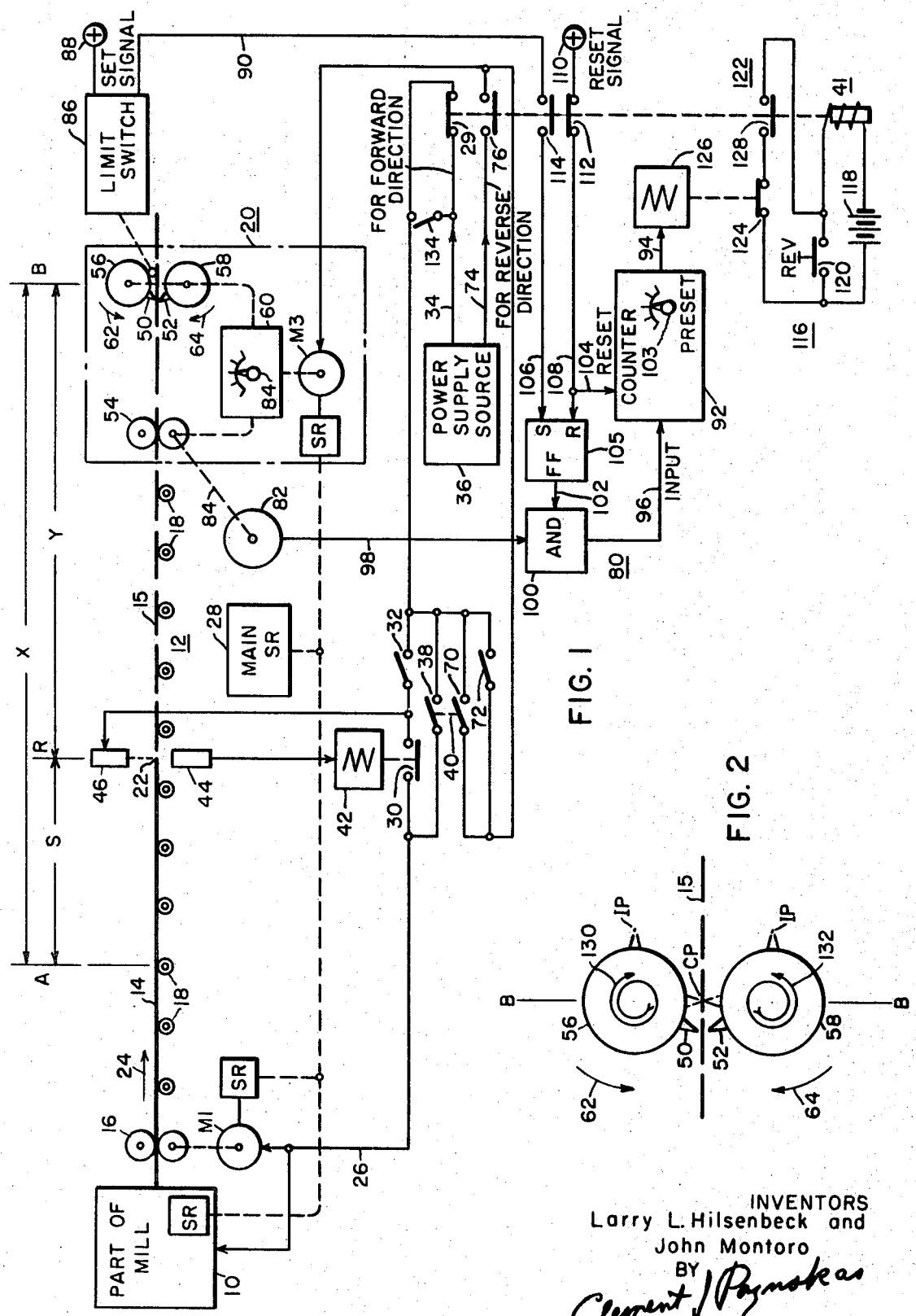

METHOD AND APPARATUS FOR INDEXING FLYING SHEARS FOR FIRST CUT SYNCHRONIZATION

BACKGROUND OF THE INVENTION

Cold metal rolling mills employ a huge, mechanically complex, flying shear for cutting the moving metal strip into successive sections of equal predetermined length C. The shear comprises input feed rolls called leveler rolls, shear blades coupled in timed relation with the feed rolls, and a motor drive coupled to the feed rolls and the shear blades. The shear operates cyclically with one shear "stroke" (cutting stroke) per cycle and a predetermined movement C of the feed rolls per cycle. The movement C corresponds to the length of strip that would be fed into the shear per cycle when the shear is receiving strip. To permit selection of any desired normal cut length C, the shear is adjustable to change the "ratio" of the feed roll travel to shear stroke.

Prior to the invention herein, first cut synchronization was customarily accomplished by jogging the shear forward while the lead end of the strip was stopped at a reference point R located a predetermined distance Y from the effective cutting line of the shear. In order to do this, the operator had to know the distance Y, the normal shear cut length C, and the desired scrap length (front crop) S. Whenever the normal shear cut length C was changed, the index distance for a given scrap length S had to be readjusted.

SUMMARY OF THE INVENTION

The present invention is directed to apparatus and method for indexing a flying shear for first cut synchronization, in which apparatus and method the normal cut length C of the shear is automatically compensated for. This eliminates the need for readjustment of the first cut indexing distance whenever the normal cut length C is changed. This maneuver is accomplished in accordance with the present invention by moving the shear in reverse from the shear stroke position (cutting position) for a distance corresponding to the length Y plus the desired scrap length S to arrive at an index position, and then starting the strip from the reference position R and the shear apparatus from the index position in the forward direction at the same time.

It is therefore an object of the invention to provide a novel flying shear control apparatus for effecting first cut synchronization.

It is another object of the invention to provide a novel method of indexing a shear for first cut synchronization.

It is a further object of the invention to provide apparatus and method for first cut synchronization of a flying shear by moving the shear in reverse to index it.

Other and further advantages and objects of the invention will become apparent from the following detailed specification taken in connection with the drawings which illustrate a preferred embodiment of the invention.

IN THE DRAWINGS

FIG. 1 is a diagram of a rolling mill employing a preferred embodiment of the invention; and FIG. 2 is a diagram illustrating various positions of the cutting elements of a flying shear in the system of FIG. 1.

DESCRIPTION OF PREFERRED EMBODIMENT

Referring now to FIG. 1, 10 and 12 are portions of a mill for processing elongate material 14, for example a cold metal rolling mill, in which case the elongate material 14 is cold metal strip. Part 10 may include mill stands and the input end of the mill, while part 12 includes a set of motor driven rolls 16, conveyor rolls 18, a reference point R and a flying shear 20.

The strip 14 is shown with a forward portion extending from the mill portion 10, and with its lead end 22 at the reference point R. Thus the forward direction of the mill is in the direction of the arrow 24. The continued normal course along which strip 14 is arranged to travel is indicated by the dashed line 15. The set of rolls 16 may for example be a set of driving pinch rolls at the delivery end of the mill to aid in the forward drive of the strip 14. Rolls 16 are driven by a motor M1. Either conveyor rolls 18, or a smooth top table may be used to support strip 14. Motor M1 and the drive motors (not shown) of the mill portion 10 are supplied with power from a line 26. Motor M1 and the respective motors in the mill portion 10 are each equipped with individual speed regulators SR, which in addition to being individually controllable may also be simultaneously controlled by a central or common main speed regulator 28 for maintaining predetermined synchronism or speed relationships between the various rolls and drive elements of the system. The various speed regulators SR maintain the associated units at predetermined desired speeds.

Line 26 may be energized through a set of normally closed relay contacts 29, a set of normally open relay contacts 30 and a switch 32 when closed, from an output line 34 of a suitable source of electric power 36. Line 26 may also be energized from the output line 34 through contacts 29 and one set of contacts 38 of a double pole switch 40 when closed. The output on line 34 is of such sense or polarity as to provide forward motor power, that is to drive the various motors in the forward direction so as to drive the strip 14 in the direction of arrow 24. Normally closed contacts 29 are part of a relay 41.

Normally open contacts 30 are a part of a relay 42, which when operated in response to a signal from a photodetector 44 will actuate the contacts 30 to the closed position. Photodetector 44 and an associated light source 46 are disposed on opposite sides of the line of travel of strip 14, so that a light beam from the light source 46 directed toward the photodetector 44 is interrupted when the lead end of the strip 14 reaches reference point R. When the light beam is cut off, photodetector 44 provides an output signal to relay 42, energizing the latter to close the contacts 30. From the above, it should be apparent that when the mill is operating in a forward direction by power supplied through closed switch 32 and closed contacts 30, power will be disconnected when the lead end of strip 14 breaks the light beam from light source 46, thus to stop the lead end of the strip 14 at the reference point R.

The flying shear 20 is a cyclically operable mechanism provided with cooperable cutting elements 50 and 52 movable to and away from the cutting position (closed position), and power driven input feed rolls 54 located in the line of travel of strip 14 to propel the strip through a cutting zone CZ. By way of example, the cutting zone CZ lies along a line passing through the intersection of and normal to lines 15 and B. Cutting elements 50 and 52 are carried by rotatable members 56 and 58, respectively, which are driven in opposite directions. The cutting or closed position of the cutting elements is that position in the cycle of movement thereof in which the cutting elements close to cut the strip 14 when the strip is in the cutting zone CZ. By way of example, the elements 50 and 52 close at the intersection of lines 15 and B. Thus the line B references the cutting line of the shear 20, i.e. location at which the cuts take place.

In order to drive the feed rolls 54 in predetermined synchronism with the cutting elements 50 and 52, rotatable members 56 and 58 are mechanically coupled to the feed rolls 54 through an adjustable ratio coupling mechanism 60 driven by a motor M3. The arrangement is such that rotation of motor M3 will drive the feed roll 54 and the cutting elements 50 and 52 in synchronism through a successively repeatable cycle wherein the cutting elements move to the cutting position once per cycle, while the feed rolls move a predetermined amount per cycle corresponding to a predetermined lineal travel distance C which such feed movement would impart to the strip 14 when received by the feed rolls 54. It should be noted that the ratio of movement between rolls 54 and the cutting elements 50–52 is the same for forward or reverse directions. It should also be noted that the normal cutting direction of the cutting elements 50 and 52 (forward direction of the shear) is in the direction of arrows 62 and 64, respectively. Thus for the forward direction of the shear 20, the drive arrangement (motor M3 and coupling 60) drives the member 56 counterclockwise and the member 58 clockwise.

Power to drive motor M3 in the forward direction may be supplied by the power supply line 34 through contacts 29 and contacts 70 of switch 40 when closed or a switch 72 when closed. Motor M3 is also equipped with a speed regulator SR which may be independently set or controlled in concert with the other speed regulators through the main speed regulator SR to maintain desired mill speeds. Power to drive motor M3 in the reverse direction is supplied from an output line 74 of the electric power source 36 through a set of normally open relay contacts 76 of relay 41 when these contacts are closed. The electric power on line 74 is properly sensed to drive motor M3 in the reverse direction.

The amount of forward or reverse movement of the shear 20, whether or not strip 14 is present, may be expressed in terms of lineal travel of strip material through the shear.

For example, if the shear 20 is driven forward 10 feet, this means that if strip were present in the shear, the strip would be moved 10 feet. Although strip is not normally present in the shear when the shear is reversed, the reverse movement may still be expressed in terms of lineal travel of strip. Since the cutting elements 50 and 52 are coupled to the feed rolls 54, any given angular position of the cutting elements is related to a particular lineal feed measurement. For example if the ratio of lineal feed by rolls 54 to cutting stroke is 20 feet of feed to each cutting stroke per cycle of the shear, and if there is one cutting stroke per revolution of the cutting elements, then if motor M3 drives the shear forward 5 feet from the position shown in the drawing, the cutting elements would rotate 90° in the direction of the arrows 62 and 64. On the other hand if the shear is driven 5 feet in reverse, the cutting elements would move 90° in the directions opposite to the arrows 62 and 64. The ratio of lineal feed to shear stroke per cycle may be changed by changing the coupling ratio between the feed rolls 54 and the rotatable members 56 and 58, for example by turning a selector knob 84 on the coupling mechanism 60. The knob 84 may be calibrated in desired cut lengths C.

An arrangement 80 for tracking reverse movement of the shear 20 includes a pulse producer, for example a digital tachometer generator 82, for providing successive pulses representing successive equal increments of reverse movement of the shear 20 corresponding to equal increments of lineal feed. For example, the tachometer may produce one pulse for each movement increment of the shear equivalent to one inch of lineal feed. The tachometer 82 is coupled to the shear 20, for example by a mechanical connection 84 to the feed rolls 54.

The tracking apparatus 80 further includes an arrangement for counting pulses produced by the pulse provider 82, and for stopping reverse movement of the shear in response to a predetermined count of the pulses, which count is begun when the cutting elements of the shear first reach their closed position while moving in reverse.

More specifically the tracking apparatus 80 includes, means, for example a limit switch 86, for supplying a signal when the cutting elements 50 and 52 first reach their closed position while moving in reverse, i.e., opposite to the arrows 62 and 64. When operated, the limit switch 86 connects an electric power source 88 to a line 90.

Tracking apparatus 80 further includes a presettable counter 92 that provides an output signal on a line 94 when the counter counts a predetermined number of successive pulses received on its input line 96. Pulses from the tachometer 82 are supplied to an input line 98 of a gate 100, which passes the pulses to the counter input line 96 when a gating signal is present on a second input line 102 of the gate 100. The counter 92 is provided with adjustment means controlled by a selector knob 103 for changing the value of the predetermined number of input pulses in response to which the counter will produce an output signal. The counter is reset to zero when a reset signal is applied to its reset line 104.

Line 102 is connected to an output of a bistable device 105 such as flip-flop having respective set and reset states. In the set state, the flip-flop supplies a gating signal to line 102. In its reset state, the flip-flop does not supply a gating signal to line 102. The flip-flop 105 switches to its set state in response to a signal on its set input line 106, and switches to its reset state in response to a signal on its reset input line 108. Reset signals are supplied from an electric power source 110 through a set of normally closed contacts 112 of relay 41. Set line 106 is connected to one side of a set of normally open contacts 114 of relay 41, the other side of this contact set being connected to line 90.

Relay 41 is controlled by a control circuit 116 in which power from a battery 118 energizes the operating coil relay 41 to pull in the relay when a reverse switch button 120 is momentarily depressed. Thereafter the relay is held in by a holding or latching circuit 122 connected across the contacts of switch 120, and including normally closed contacts 124 of a relay 126 and a set of normally open contacts 128 (when closed) of relay 41. It should now be apparent that the holding circuit 122 will be broken to drop out the relay 41 when relay 126 is operated (pulled in) in response to the output of counter 92 produced at the end of the predetermined count.

Operation of the disclosed exemplary embodiment of the invention will be better understood from the following description.

First it should be observed that the selector 84 for the normal cut length C is calibrated in feet and inches. In a particular operating example, the elongate material 14 is cold metal strip 60 inches wide and about one-fourth inch thick, and the value of the normal cut length C is selected from values ranging from two to twenty feet. Assume for background information that the desired value for C is 20 feet. In accordance with this, selector 84 is manually set for 20 feet.

It should further be noted that reference point R is Y distance away from the cutting line B at which the shear knives 50 and 52 close to sever the metal strip. Assume for example that Y is 13 feet and that the desired scrap length S (front crop cut) is 2 feet. Thus for the operating example, normal cut to length C=20 feet
desired scrap length S=2 feet
distance Y=13 feet The count selector 103 is set to the pulse count for the value of S+Y, which in the example will be (2+13) 12=180, where the "2" is S in feet, the "13" is Y in feet and the "12" is the number of pulses produced by tachometer 82 for each lineal foot of feed motion.

Assume first that: the mill is shut down; there is no strip 14 present; switches 32, 40 and 72 are open as shown in FIG. 1; all the relays are unoperated (dropped out) as shown in FIg. 1; and the shear knives 50 and 52 are in some random portion for example the position shown in solid lines FIGS. 1 and 2. Flip-flop 105 and counter 92 are in the reset state. Now assume that an operator closes switch 32, thereby activating light source 46 to transmit a light beam to detector 44. As a result relay 42 is pulled up to close contacts 30, thereby starting up the mill including motor M1, and the motors in mill part 10, thus to begin processing strip 14. Eventually strip 14 emerges from mill part 10, passes through rolls 16 and over those conveyor rolls 18 on the left of reference point R. When the leading end 22 of strip 14 reaches the point R, it interrupts the light beam from source 46. This causes loss of output from detector 44, thereby dropping out relay 42 and opening contacts 30 to stop the strip 14 with its leading end 22 at point R.

With the leading edge 122 at reference point R, the location of the desired first cut on strip 14 is indicated by reference point A which is S distance away from reference point R. The reference point B indicates the cutting line of the shear, i.e., the location in the shear at which the shear knives 50 and 52 close to cut strip when present.

It should be noted, that to simplify the explanation of operation, ideal conditions have been assumed thus ignoring such effects as delays, etc. For example, as a practical matter the team of light 46 and light detector 44 would be located slightly to the left of point R, so that the leading end 22 of strip 14 would halt at point R.

Next the operator opens switch 32, and then of depresses the reverse start button 120, thereby operating (pulling in) relay 41 to make the following contact changes. Contacts 128 close to latch the relay; contacts 112 and 29 open; and contacts 76 and 114 close. Closure of contacts 76 applies properly sensed electric power to drive motor M3 in reverse thus to move the shear 20 in reverse. The cutting elements 50 and 52 start moving in the direction of arrows 130 and 132 (FIG. 2), i.e. in reverse, starting from the position shown in the drawing FIGS. and coincident with the feathered end of arrows 130 and 132. Simultaneously, rolls 54 start moving in reverse causing tachometer 84 to start providing pulses on line 98. However, at this time the pulses on line 98 do not reach the counter 92 because the gate 100 is closed, there being no gating signal on line 102 since flip-flop 105 is still in the reset state. Note that limit switch 86 is normally open.

As the cutting elements 50 and 52 travel in reverse they reach and pass through their cutting position (closed position) shown in dot-dash at CP in FIG. 2. In response to the cutting elements reaching their cutting position, limit switch 86 is momentarily closed to transmit a signal from power source 88 to the set input line 106 of flip-flop 105 through line 90 and closed contacts 76, that is, when the cutting elements 50 and 52 close as indicated at CP, limit switch 86 is operated to send a set signal to flip-flop 105, thereby switching the flip-flop to the set state which provides a gating signal on line 102.

The signal on line 102 opens the gate 100 to pass the pulses from tachometer 82 to the counter 92. As the shear continues moving in reverse the counter 92 continues to count the tracking pulses from the tachometer 82 until the count of 180 pulses (representing distance S + Y) is reached, at which time the counter provides a signal on line 94 to operate (pull in) relay 126, thereby opening contacts 124 to open the latching circuit 122. As a result relay 41 drops out causing the following effects: the shear 20 is stopped with the shear knives 50 and 52 at the index position indicated in dot-dash at IP in FIG. 2; and the flip-flop 105 and the counter 92 are reset. Reset of the flip-flop 105 closes gate 100. The shear 20 is now stopped in the indexed position.

Next, the operator closes switch 40, to start motor M1 and the shear motor M3 at the same time in the forward direction, so that the leading end 22 of strip 14 starts moving forward from reference point R at the same time as the shear 20 starts moving in the forward direction. The speeds are regulated so that the feed rates of rolls 16 and roll 54 are the same. When the strip 14 travels a distance equal to Y + S, in the example 13 + 2 or 15 feet, the shear knives 50 and 52 will close to make the first cut and a piece of scrap equal to the desired scrap length S, in this case 2 feet, will be cut off from the forward end of the strip 14. Every cut length after this will be the normal shear cut length C, which in the example is 20 feet.

Since Y is constant, the count selector 103 2 be calibrated in terms of S. Thus in the example where S=2 feet, the particular position of selector 103 representing a desired preset count response of 180 is marked as "2." In another example, suppose that S=3 feet, then the desired preset count response is equal to 12(3+13)=192, and the particular position of selector 103 for that count is marked as "3".

It should be apparent from the description herein that the invention provides apparatus and method for "first cut synchronization" wherein the normal cut length C of the shear is automatically compensated for. This eliminates readjustment of the indexing distance for every normal cut length C. Thus if the desired scrap length S is 2 feet, the selector 103 is set for 2 feet, and is not changed even if the selector 84 is changed to provide various normal cut lengths C.

A manual switch 34 may be closed if it is desired to bypass contacts 29 in order to index the shear while the strip is moving toward reference point R.

Although described as a rolling mill by way of example, it should be understood that the composite system (parts 10 and 12) for processing elongate material may be a shear line which accepts coiled sheet in part 10 for processing into predetermined lengths by the shear 20.

It is to be understood that the specific apparatus disclosed herein is by way of example only in order to illustrate the invention.

We claim:

1. In a system for processing moving elongate material along a predetermined course, said system having first drive means for driving said material forwardly along said course, said system having along said course cyclically operable cutting apparatus operable in timed relation with the movement of said material to normally cut the material into successive pieces of equal predetermined length, said cutting apparatus having cutting means movable within a constrained path to and away from a cutting position, feed means for advancing the elongate material toward the cutting means, and reversible second drive means coupled to the cutting means and the feed means for driving them in predetermined synchronism through a successively repeatable cycle wherein the cutting means moves to the cutting position once per cycle and the feed means moves a predetermined amount per cycle corresponding to a predetermined lineal travel which such feed movement would impart to elongate material received thereby, the combination therewith of first cut control means for causing said cutting apparatus to initially cut off a piece of desired length S from the lead end of the elongate material, said first cut control means comprising:

A. means for positioning the leading end of the elongate material along said course at a reference point R located a predetermined distance Y from the cutting line of the cutting apparatus;

B. tracking means for tracking reverse movement of the cutting apparatus, the tracking means being responsive to the first arrival of the cutting means at the cutting position while moving in reverse to start tracking the continued reverse movement of the cutting means, said tracking means providing an output signal in response to the arrival of the cutting means at an index position corresponding to a reverse movement of the feed means equivalent to lineal travel of Y + S distance;

C. means responsive to said output signal for stopping reverse movement of said cutting apparatus; and D. means for synchronously starting said first and second drive means in the forward direction so that the cutting apparatus starts moving from the index position at the same time as the leading end of the elongate material starts moving from the reference position R, whereby the leading end of the elongate material moves a distance equal to Y + S before said cutting means reaches the cutting position thus to effect a cut at a distance equal to S back of said leading end.

2. The combination as in claim 1 wherein said tracking means comprises pulse generating means responsive to reverse movement of said cutting apparatus for generating successive pulses representing successive equal increments of reverse movement of said cutting apparatus, circuit means including counting means for producing said output signal in response to a predetermined count of said pulses, and means for beginning said predetermined count in response to the first arrival of the cutting means at the cutting position while moving in reverse.

3. The combination as in claim 2 wherein said circuit means includes means for selectively adjusting the magnitude of said predetermined count.

4. In the operation of a system for processing moving elongate material along a predetermined course, said system having first drive means for driving said material forwardly along said course, said system having along said course cyclically operable cutting apparatus operable in timed relation with the movement of said material to normally cut the material into successive pieces of equal predetermined length, said cutting apparatus having cutting means movable within a constrained path to and away from a cutting position, feed means for advancing the elongate material toward the cutting means, and reversible second drive means coupled to the cutting means and the feed means for driving them in predetermined synchronism through a successively repeatable cycle wherein the cutting means moves to the cutting position once per cycle and the feed means moves a predetermined amount per cycle corresponding to a predetermined lineal travel which such feed movement would impart to elongate material received thereby, the method of controlling said cutting apparatus to initially cut off a piece of desired length S from the lead end of the elongate material, said method comprising the steps of:

A. positioning the leading end of the elongate material along said course at a reference point R located a predetermined distance Y from the cutting position of the cutting means;
B. starting said cutting apparatus in reverse;
C. tracking the reverse movement of the cutting apparatus from a time beginning with the first arrival of said cutting means at the cutting position;
D. stopping said cutting apparatus when the cutting means arrives at an index position corresponding to a reverse movement of the feed means equivalent to lineal travel of $Y + S$ distance; and
E. synchronously starting said first and second drive means in the forward direction so that the cutting apparatus starts moving from the index position at the same time as the leading end of the material starts moving from said reference position R, whereby the leading end of the elongate material moves a distance equal to $Y + S$ before said cutting means reaches the cutting position thus to effect a cut at a distance equal to S back of said leading end.

5. The combination as in claim 4 wherein said step C includes generating successive pulses representing successive equal increments of reverse movement of said cutting means, counting said pulses beginning with the first arrival of the cutting means at the cutting position while moving in reverse, stopping the reverse movement of the cutting apparatus after counting a number of said pulses representing $Y + A$ distance.